H. REDDEN,

Assignor to A. M. Underhill.

BAG-FASTENER.

No. 7,735. Reissued June 12, 1877.

WITNESSES:

W. W. Hollingsworth

Solon C. Kemon

INVENTOR:

Henry Redden

BY

Munn & Co.

ATTORNEYS.

UNITED STATES PATENT OFFICE.

HENRY REDDEN, OF NEW YORK, N. Y., ASSIGNOR TO ANDREW M. UNDERHILL.

IMPROVEMENT IN BAG-FASTENERS.

Specification forming part of Letters Patent No. 188,673, dated March 20, 1877; reissue No. 7,735, dated June 12, 1877; application filed May 26, 1877.

*To all whom it may concern:*

Be it known that I, HENRY REDDEN, of the city, county, and State of New York, have invented a new and useful Improvement in Bag-Fasteners; and I do hereby declare that the following is a full, clear, and exact description of the same, reference being had to the accompanying drawing, forming part of this specification, in which—

Figure 1:
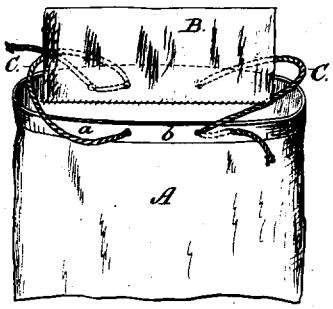
Figure 2:
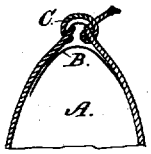
Figure 3:
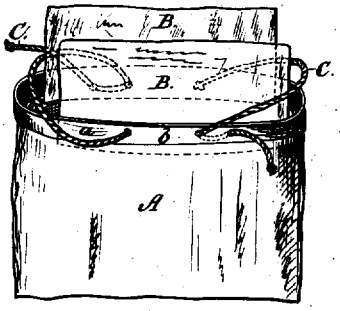
Figure 4:
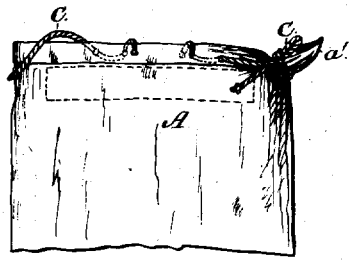
Figure 5:
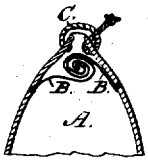

Figure 1 is a top perspective of the upper part of a bag with a single flap or apron. Fig. 2 is a section of the same taken transversely to the flap. Fig. 3 is a top perspective view of the upper part of a bag with the two flaps or aprons. Fig. 4 is a side view of the same with the bag closed and one of its strings tied and the other loose. Fig. 5 is a sectional view of the upper part of a bag having the two flaps, the section being taken transversely to the flaps.

The object of this invention is to improve the construction of the bag for which Letters Patent No. 177,749 were granted May 23, 1876, in such a way that its contents may be discharged readily and quickly, and which, when tied, will prevent any leakage of its contents.

The invention will first be described in connection with the drawing, and then pointed out in the claim.

Referring to the drawing, A represents the body of the bag, in the mouth of which, at a little distance from the edges and beneath the hem *a b*, are permanently sewed the inner edges of one or two flaps or aprons, B. When two such flaps are employed, they are sewed upon opposite sides of the bag, and are entirely separate from each other.

When the bag with one flap is filled, the flap is pressed loosely into the mouth of the bag and tucked down close to the opposite side of the bag, as in Fig. 2; but when a bag with two flaps has been filled, the outer edges of the two flaps B are brought together, and the said flaps are rolled together within the mouth of the bag, as shown in Fig. 5; or the said flaps may be pressed loosely into the mouth of the bag, if desired. The mouth of the bag is then drawn together over the flap or flaps B, by the cords or strings C, whose ends are secured to the edges of the mouth of the bag A upon the opposite sides of, and at a little distance from, its center. The strings C are then passed over the mouth of the bag, in through its other side, along the edge, and out at a little distance from the ends of said edges.

The strings C should have knots formed upon their outer ends, to prevent them from being drawn in. After the strings C have been drawn tight over the flap or flaps B, their ends are passed around the corners of the bag and tied, so as to secure them, and, at the same time, form projections *a'* for convenience in handling the bags.

With this construction, by loosening the strings C, the bag may be emptied with as much facility as if there were no flaps attached to its mouth, the said flaps offering no obstruction to the outflow of the contents of the bags.

I am aware that it is not new to use on one side of a bag an inturned flap secured by a a double hook; but

What I claim is—

A grain-bag provided with apertured hem *a b*, folding apron B, and running cords C, the apron being fastened on the inside near inner edge of hem, while the cord runs parallel to hem, as shown and described, to allow the bag to be fastened quickly without sewing, and opened without cutting.

HENRY REDDEN.

Witnesses:
C. SEDGWICK,
ALEX. F. ROBERTS.